United States Patent [19]
Harrell et al.

[11] 3,821,696

[45] June 28, 1974

[54] DOWNHOLE DATA GENERATOR FOR LOGGING-WHILE-DRILLING SYSTEM

[75] Inventors: John W. Harrell, Duncanville; Bobbie J. Patton, Dallas; Billy G. Ballard, Garland, all of Tex.

[73] Assignee: Mobile Oil Corporation, New York, N.Y.

[22] Filed: Mar. 13, 1973

[21] Appl. No.: 340,789

[52] U.S. Cl. ...... 340/18 LD, 340/18 P, 340/18 NC, 340/347 AD, 235/154

[51] Int. Cl. .......... G01v 1/40

[58] Field of Search ......... 340/18 P, 18 LD, 18 NC, 340/18 FM, 347 AD, 15.5 BH; 318/314; 235/154

[56] References Cited

UNITED STATES PATENTS

| | | | |
|---|---|---|---|
| 3,015,801 | 1/1962 | Kalbfell | 340/18 FM |
| 3,309,656 | 3/1967 | Godbry | 340/18 LD |
| 3,495,208 | 2/1970 | Grada | 318/314 |
| 3,514,750 | 5/1970 | Pritchett et al. | 340/18 R |
| 3,560,915 | 2/1971 | Elliott et al. | 340/18 R |
| 3,725,857 | 4/1973 | Pitts | 340/18 CM |

*Primary Examiner*—T. H. Tubbesing
*Assistant Examiner*—N. Moskowitz
*Attorney, Agent, or Firm*—A. L. Gaboriault; William J. Scherback

[57] ABSTRACT

A logging-while-drilling system includes a downhole digital data generator. A multiplexer applies analog signals representing sensed downhole conditions to an analog-to-digital converter. The digital bits are stored in the analog-to-digital converter while a programmed switching means sequentially switches each of the parallel bits to a single output to convert the parallel bits to a serial-by-bit signal. An encoder responds to the serial-by-bit signal to control the speed of a rotor in the transmitter to produce a phase encoded sonic signal in the drilling liquid in the well being investigated. A stable source of high frequency clock pulses is used to generate all of the required timing clock pulses with high resolution. In order to do this, serial frequency dividers count down the basic clock pulse to produce sonic pulses, bit clock pulses, word clock pulses and frame clock pulses.

11 Claims, 26 Drawing Figures

DOWNHOLE DATA GENERATOR FOR LOGGING-WHILE-DRILLING SYSTEM

BACKGROUND OF THE INVENTION

This invention relates to the generation of digital data relating to downhole conditions obtained from the logging of wells during drilling and more particularly to a downhole digital data generator having accurately controlled timing for a logging-while-drilling system.

It has long been the practice to log wells, that is, to sense various downhole conditions within a well, and concomitantly therewith transmit the acquired data to the surface. Well logging operations performed by service companies today utilize wireline or cable-type logging procedures. In order to conduct the operations, drilling is stopped and the drill string removed from the well. It is costly to stop drilling operations in order to log. The advantages of being capable of logging-while-drilling are obvious. However, the lack of an acceptable telemetering system has been a major obstacle to a successful logging-while-drilling operation.

Various telemetering methods have been suggested for use in logging-while-drilling procedures. For example, it has been proposed to transmit the acquired data to the surface electrically. Such methods have in the past proven impractical because of the need to provide the drill pipe with a special insulated conductor and means to form appropriate connections for the conductor at the drill pipe joints. Other techniques proposed for use in logging-while-drilling operations involve the transmission of acoustic signals through the drill pipe. Exemplary of such telemetering systems are those disclosed in U.S. Pat. Nos. 3,015,801 and 3,205,477 to Kalbfell. In the Kalbfell systems, an acoustic energy signal is imparted to the drill pipe and the signal is frequency modulated in accordance with a sensed downhole condition. Frequency shift keying is employed to transmit the acquired data in a digital mode. Other telemetering procedures proposed for use in logging-while-drilling systems employ the drilling liquid within the well as the transmission medium. Of these perhaps the most promising is the technique described in U.S. Pat. No. 3,309,656 to Godbey. In the Godbey procedure, an acoustic wave signal is generated in the drilling liquid as it is circulated through the well. This signal is modulated in order to transmit the desired information to the surface of the well. At the surface the acoustic wave signal is detected and demodulated in order to provide the desired readout information.

United States Pat. No. 3,789,355 to Patton describes a logging-while-drilling system wherein telemetry of information to the surface of the well is accomplished by phase modulation of an acoustic signal. An acoustic signal is generated and transmitted upwardly through the drilling liquid to a remote uphole station. The acoustic signal is modulated between two phase states in response to digitally coded data bits produced as a function of a downhole condition. A change in phase state represents a bit of one character and lack of change in phase state represents a bit of a different character. An uphole receiving system produces an output signal representative of the phase and frequency of the acoustic signal. This is converted to bit clock pulses which define the bit time intervals and a bit value signal representing the generated bits.

The foregoing United States Pat. No. 3,789,355 shows a complete logging-while-drilling system and the disclosure thereof is incorporated herein by reference. The subject invention is described herein as an improved data generator for that system.

SUMMARY OF THE INVENTION

In accordance with this invention all of the downhole timing clock pulses for the downhole data generator are derived from a single highly stable clock. Serial frequency dividers divide the reference clock down to the desired frequencies. The frequency dividers are programmable, adjustable dividers. They produce highly accurate timing pulses which define a variable format for the digital words transmitted uphole. In particular, the frequency divider which produces the bit clock pulses which determine the number of acoustic cycles per bit is adjustable to provide a variable bit length which is determined by the number of sonic cycles it contains. The signal energy retrieved from a bit is proportional to the bit length. Normally, the signal-to-noise ratio decreases with increasing depth and it is important to have the capability of increasing the bit length as the depth increases thus maintaining the shortest bit length (consequently, the highest data rate) while maintaining substantially error free transmission of data in the environment of the prevalent signal-to-noise ratio.

In accordance with another important aspect of this invention the downhole digital data generator includes an analog-to-digital converter which is used to store the converted parallel data bits while they are being sequentially switched into a serial-by-bit output. This obviates the need for a shift register which would normally be required to receive the bits in parallel and to shift them out serially.

In accordance with other aspects of this invention, the data generator inserts sync words after each frame and it inserts a parity bit for each word.

The foregoing and other objects, features and advantages of the invention will be better understood from the following more detailed description and appended claims.

DESCRIPTION OF THE DRAWINGS

FIGS. 5A–5C together are a schematic diagram of a programmable frequency divider.

DESCRIPTION OF A PARTICULAR EMBODIMENT

THE DOWNHOLE LOGGING SYSTEM, FIG. 1

Figure 1:
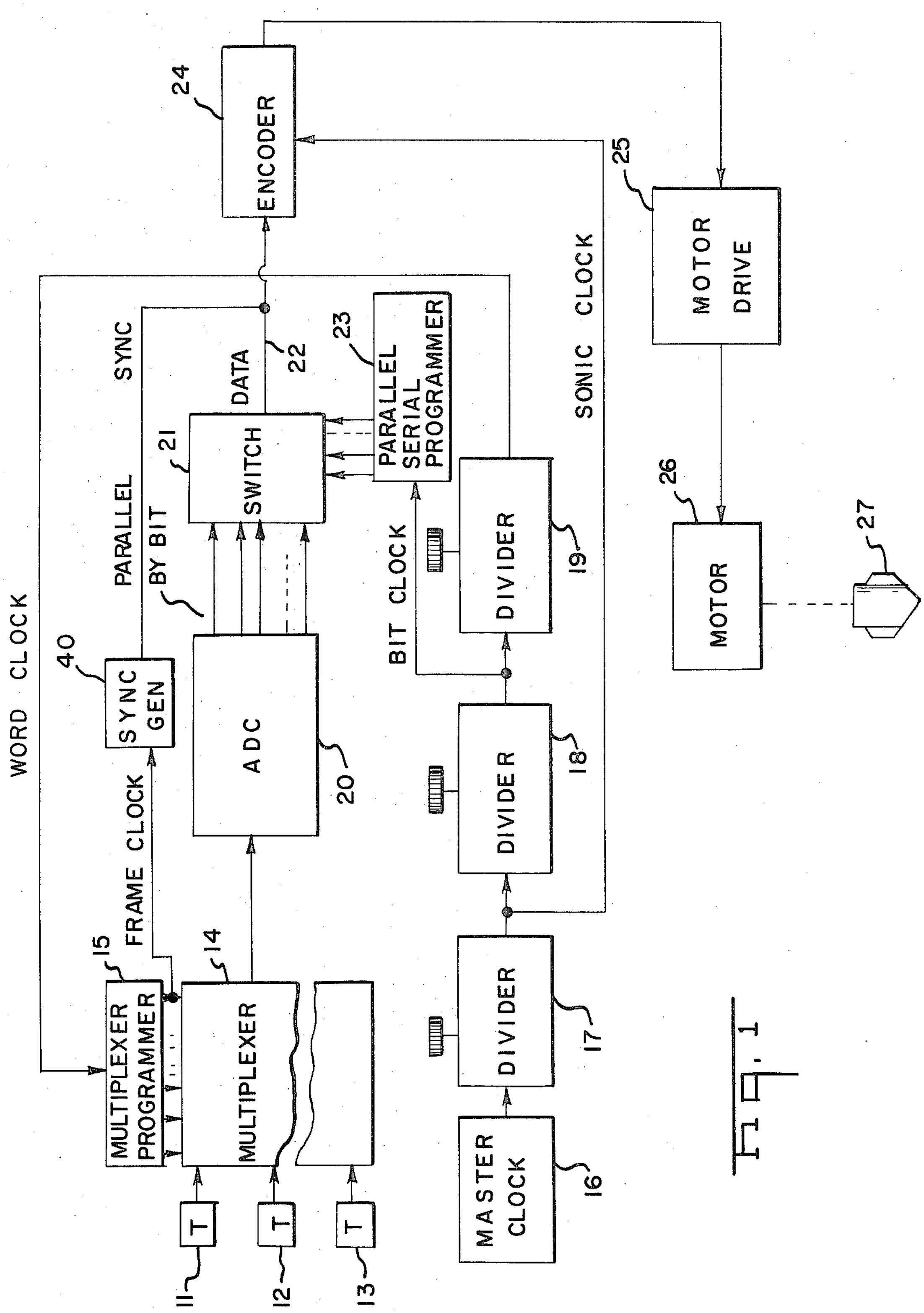
FIG. 1 is a block diagram of the downhole system.

FIG. 1 shows the overall downhole logging system. Transducers 11–13 generate analog signals representing the condition of the formations surrounding the well and/or conditions of the drilling operation such as bit speed. These analog signals are applied to a multiplexer 14 which operates under control of a programmer 15. The programmer 15 is driven by word clock pulses derived from a master clock 16 and serial frequency dividers 17, 18 and 19. The stable clock and serial frequency dividers are an important aspect of this invention. The increased accuracy obtained with such an arrangement improves the quality of the transmitted information and consequently simplifies the receiver and increases the quality of the information received uphole.

An analog-to-digital converter 20 converts the analog signals into digital words made up of parallel bits. The multiplexer sequentially applies each of the analog signals to converter 20. When all of the analog voltages have been sampled, the last stage of the programmer 15 produces a frame clock pulse signifying the completion of the conversion of all analog voltages, that is the completion of one frame. The system transmits repetitive frames of sampled voltages.

In the example being described there are ten parallel bits and a parity bit in each word. The switch 21 sequentially switches each of the parallel bits to a single output 22. Bit pulses from divider 18 are applied to a parallel serial programmer 23. The programmer responds to the bit clock pulses to program the switch 21 to sequentially apply each of the parallel bits to the single output 22.

The serial-by-bit signal is applied to encoder 24 which produces an output signal upon the occurrence of a "1" bit in the serial-by-bit signal. The encoder 24 is described in more detail in copending application Ser. No. 340,317, filed Mar. 12, 1973. This output signal is applied to the motor drive circuit 25 which drives the motor 26. The acoustic generator includes the rotating member 27 which is driven at a constant speed by the motor to produce a continuous constant frequency acoustic signal in the drilling liquid. Further the motor is driven by motor drive circuit 25 in such a manner that the acoustic signal is phase locked to the sonic clock in either of two phase states which are 180° apart (reversed). The output signal from the encoder 24 causes the motor drive 25 to momentarily change the speed of rotation of the member 27 in response to a "1" bit. This changes the phase state of the acoustic signal from one of its two states to the other. The encoder 24, motor drive 25, motor 26 and rotating member 27 form no part of the present invention and are better described in the aforementioned United States Pat. No. 3,789,355.

THE DIGITAL DATA GENERATOR, FIG. 2

Figure 2A:
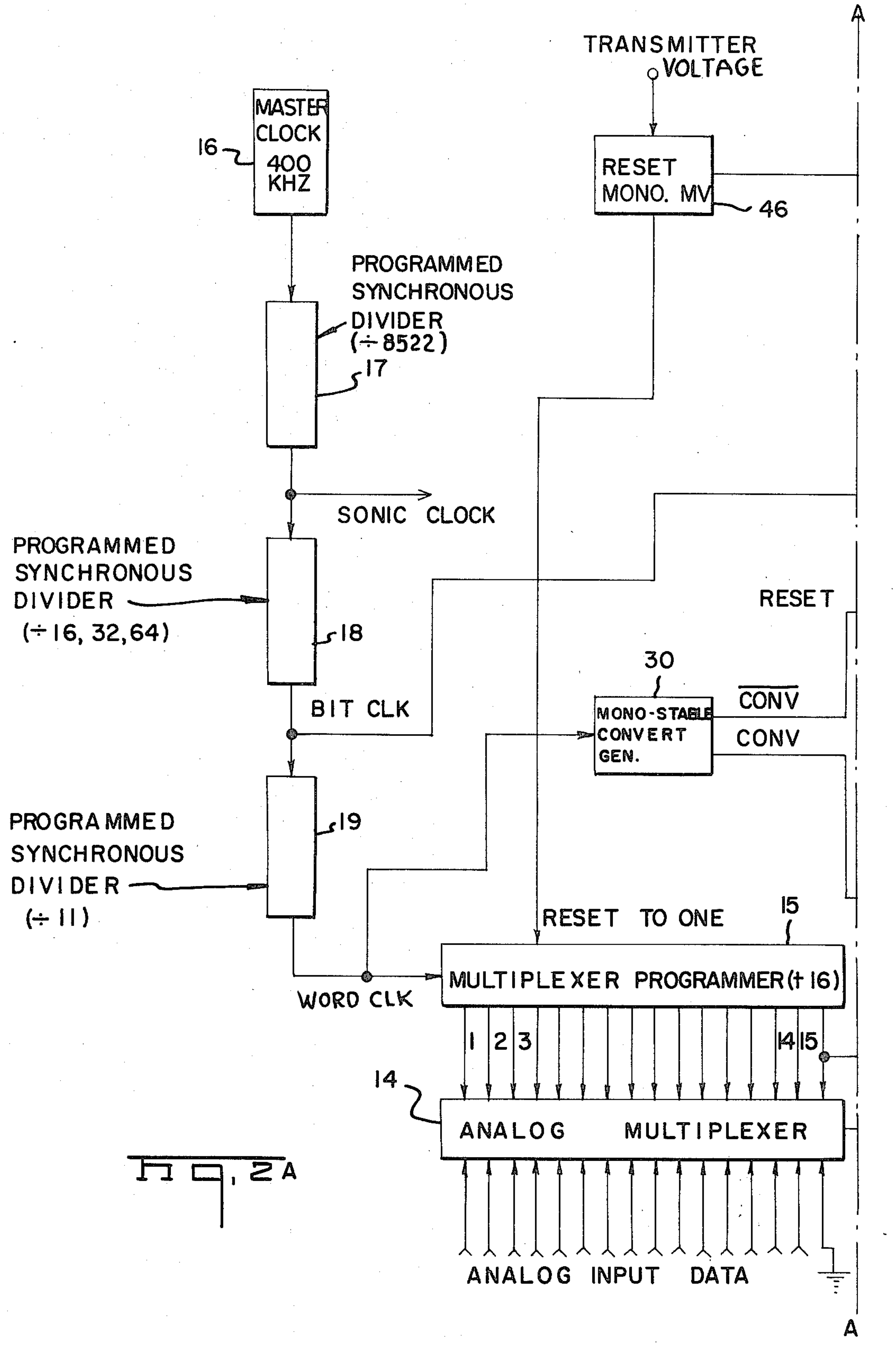
FIGS. 2A 2B and 2C together are a block diagram of the digital generator of this invention.
Figure 2B:
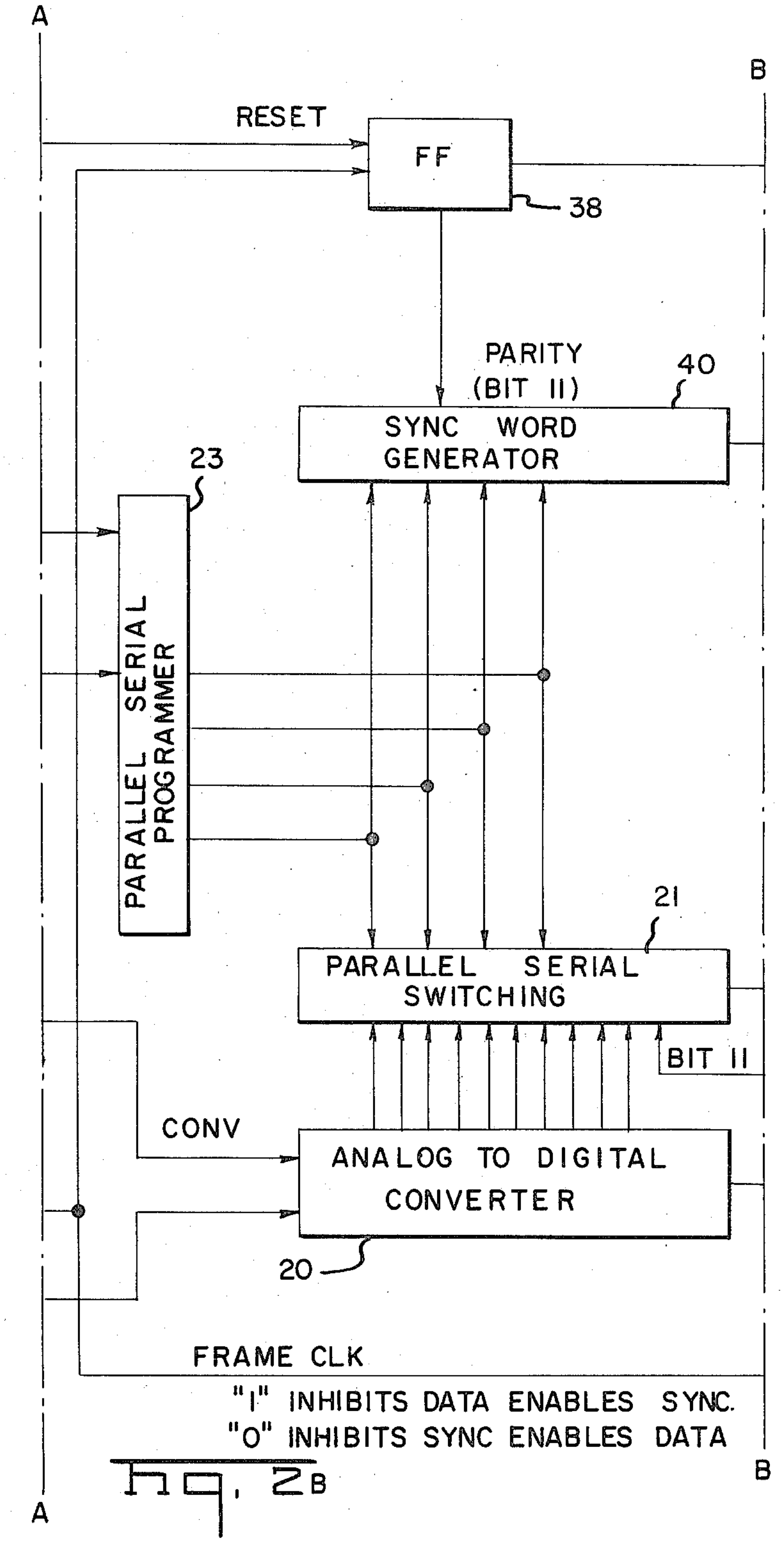
Figure 2C:
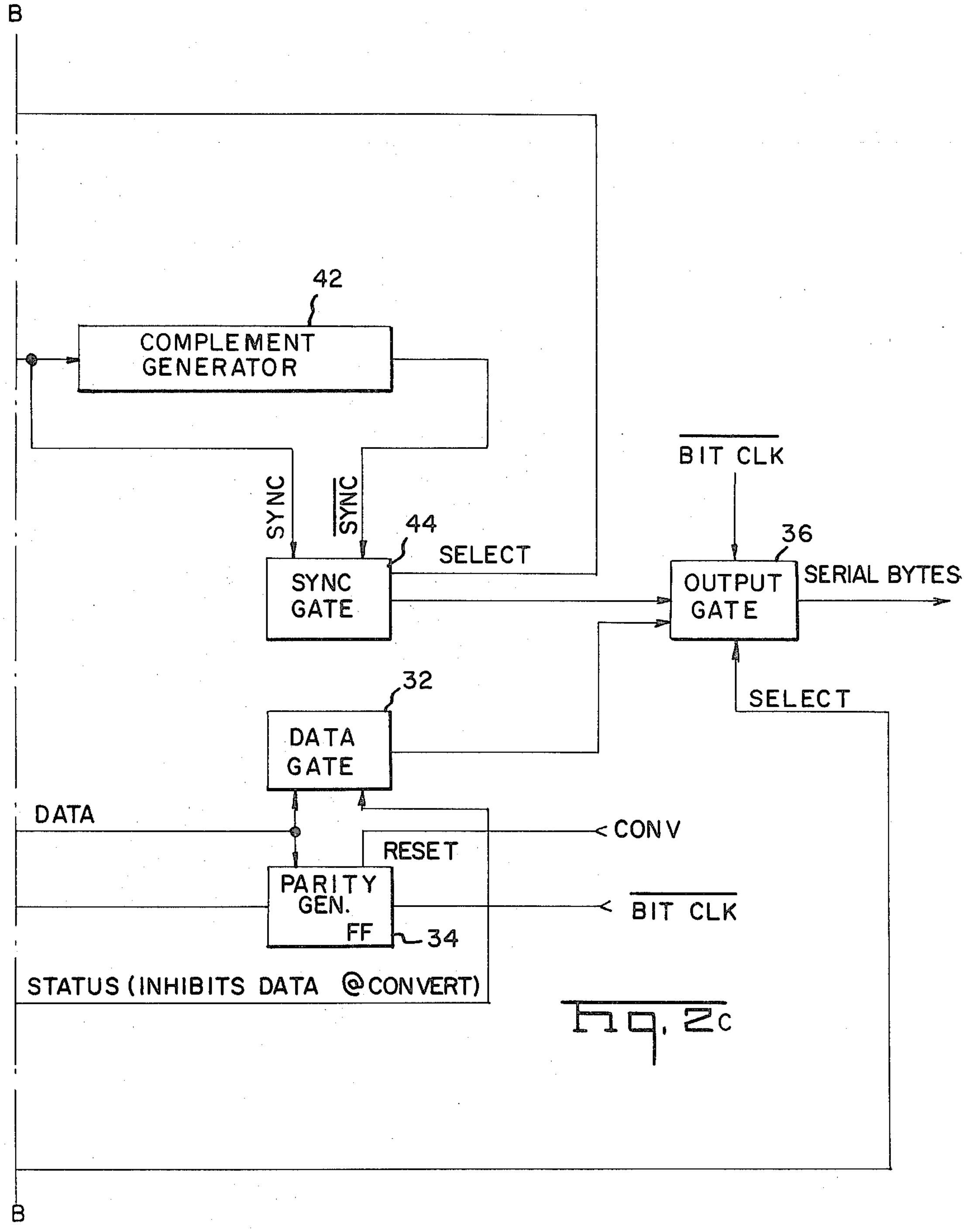

The digital data generator of this invention is shown in more detail in FIGS. 2A–2C. In FIG. 2A the master clock 16 is a 400 KHz. clock producing the wave form shown in FIG. 3A. Clock 16 drives the programmed synchronous divider 17 which may be programmed for a division of 2 to 9,999 giving it the capability of precisely generating desired frequencies. In the example being described the divider 17 is programmed for a division of 8,522 thereby producing the sonic clock pulses at a frequency of 46.93 Hz. Sonic pulses are shown in FIG. 3B (The sonic clock pulses are at twice the sonic frequency, 23.47 Hz, produced by the transmitter.)

Figures 3A, 3B, 3C, 3D, 3E, 3F, 3G:
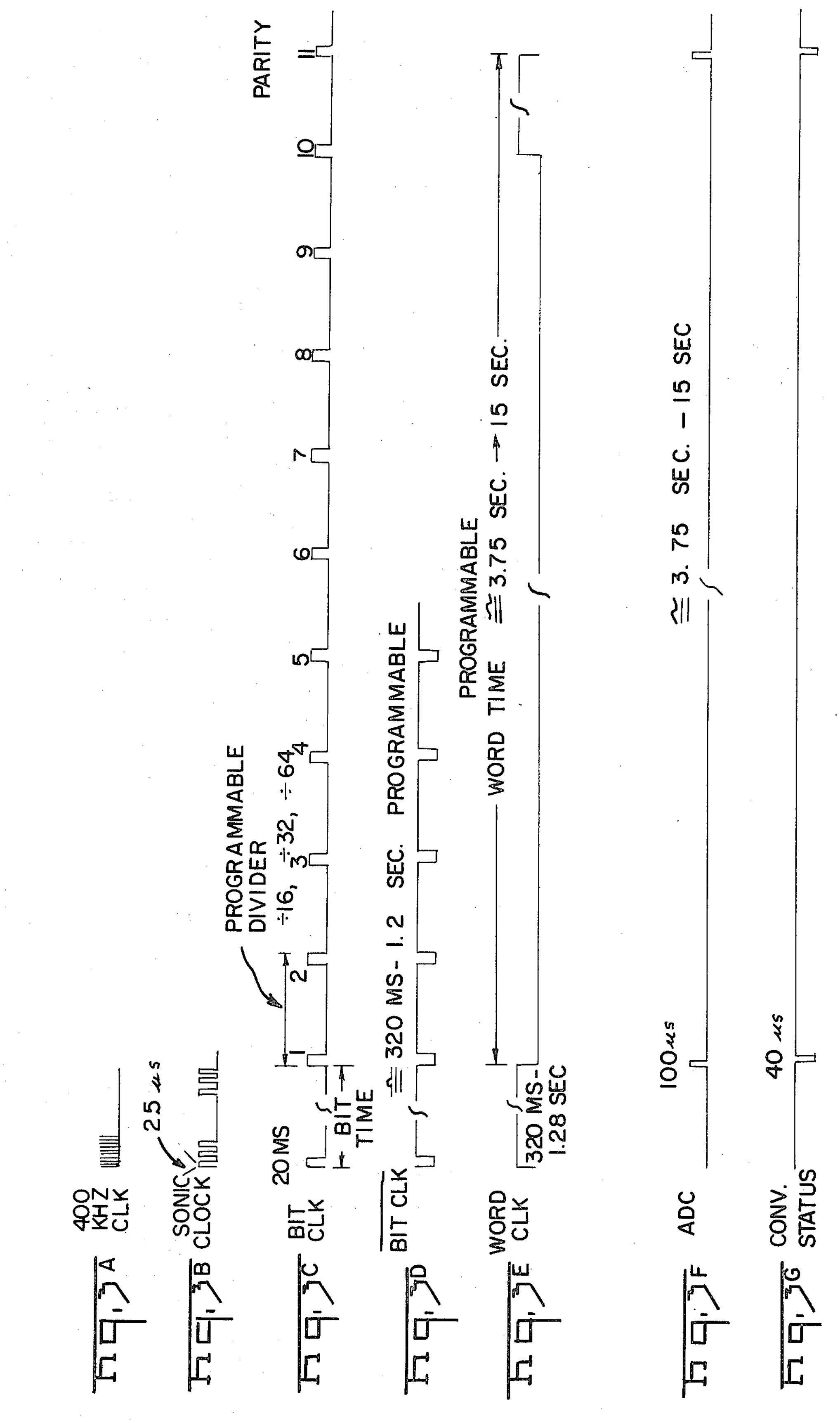
FIGS. 3A – 3G show wave forms depicting the operation of the invention.

The sonic clock pulses are in turn divided by the programmed synchronous divider 18 which produces the bit clock pulses shown in FIG. 3C. (The complement of the bit clock, $\overline{\text{Bit CLK}}$, is shown in FIG. 3D.) The synchronous divider 18 is programmable for a division of 2 to 99. In the example being described, division by 16, 32 and 64 is possible to give 8, 16 and 32 sonic cycles per bit. This provides a variable number of sonic cycles per bit, consequently a variable bit length, which can be changed as the signal-to-noise ratio changes. The bit clock pulses are divided by another programmed synchronous divider 19 programmable for division between 2 and 16. This provides a variable word length. In the example being described the divider 19 is set for division by 11 to provide a word length of 10 data bits and one parity bit. The word clock pulses from the divider 19 are shown in FIG. 3E.

The word clock pulses sequence the multiplexer programmer 15 which has a programmable length. In the example being described the length is 16. The outputs of stages of the programmer 15 are applied to analog multiplexer 14. The 16th stage of multiplexer programmer 15 produces the frame clock pulse.

The word clock pulses from divider 19 are applied to the convert delay generator 30 which is a monostable multivibrator. The output of convert generator 30 is shown in FIG. 3F. The output of the convert generator 30 starts the analog-to-digital converter 20 100 microseconds after the beginning of a data word. This delay in conversion allows the data to settle in the multiplexer 14 before it is converted. The convert delay generator 30 also resets the parallel to serial programmer 23 to a count of zero at the beginning of a data word.

Analog-to-digital converter 20 converts the analog data from the multiplexer 14 to a parallel 10 bit binary coded word. This word is stored in the analog-to-digital converter until the converter receives another convert pulse. The parallel bit outputs of the analog-to-digital converter 20 are applied to the parallel to serial switching means 21. This is driven by the programmer 23 which is driven by the bit clock pulses. The output of this switch is a serial-by-bit data signal. It is applied to a data gate 32 which is inhibited by the status signal (FIG. 3G.). This inhibits the data during the conversion from analog to digital.

The serial-by-bit data signal is also applied to the parity generator flip-flop 34. The parity generator flip-flop 34 is reset to a "1" at the beginning of each word by the convert pulse, wave form 3F. The parity generator flip-flop is clocked by the bit clock and is toggled by each "1" bit in the serial-by-bit data signal. If there is an even number of ones in the ten bits of the data signal, the flip-flop 34 will be in the "1" state after ten data bits. The output of flip-flop 34 is inserted as the eleventh bit to give odd parity.

The output of data gate 32 is applied to an output gate 36 the ouput of which is applied to the encoder. A frame clock pulse produced when the last stage of the multiplexer programmer 15 is set controls gate 36. During the time that this stage is set, data is inhibited and the generation of a sync word is enabled.

The frame pulses also set the sync word flip-flop 38. This enables sync gate 44 to insert either the sync word, from the sync word generator 40, or the complement of the sync word from the complement generator 42. In the embodiment being discussed the sync generator is a hard wired generator which generates the word 1110010011. The complement generator 42 generates the complement signal 0001101100. The output of flip-flop 38 is applied to the sync gate 44 so as to enable the sync signal to pass on certain cycles and the $\overline{\text{SYNC}}$ signal to pass on alternate cycles. The advantage of transmitting both the sync word and its complement on alternate frames is this. A data word might possibly have the same bit value sequence as the sync word and this could throw the uphole receiver out of synchronism. However, it is highly improbable that there would be a data word having the bit value sequences of the sync word and its complement in alternate frames. Therefore, the uphole receiver can easily keep in synchronism with this transmission.

The sync flip-flop 38 is also used to set the parity bit for the sync word. The flip flop sets a "1" into the eleventh bit position of the sync word and the sync word complement, to produce odd parity.

In order to reset all of the flip-flops and programmers properly upon startup of the system, a reset monostable multivibrator 46 is provided. The transmitter voltage is applied to this multivibrator to trigger it. When the transmitter is turned on, the reset multivibrator 46 resets the multiplexer programmer 15 to channel one. It also resets the sync word flip-flop 38.

Figures 4A, 4B, 4C, 4D, 4E, 4F, 4G, 4H:
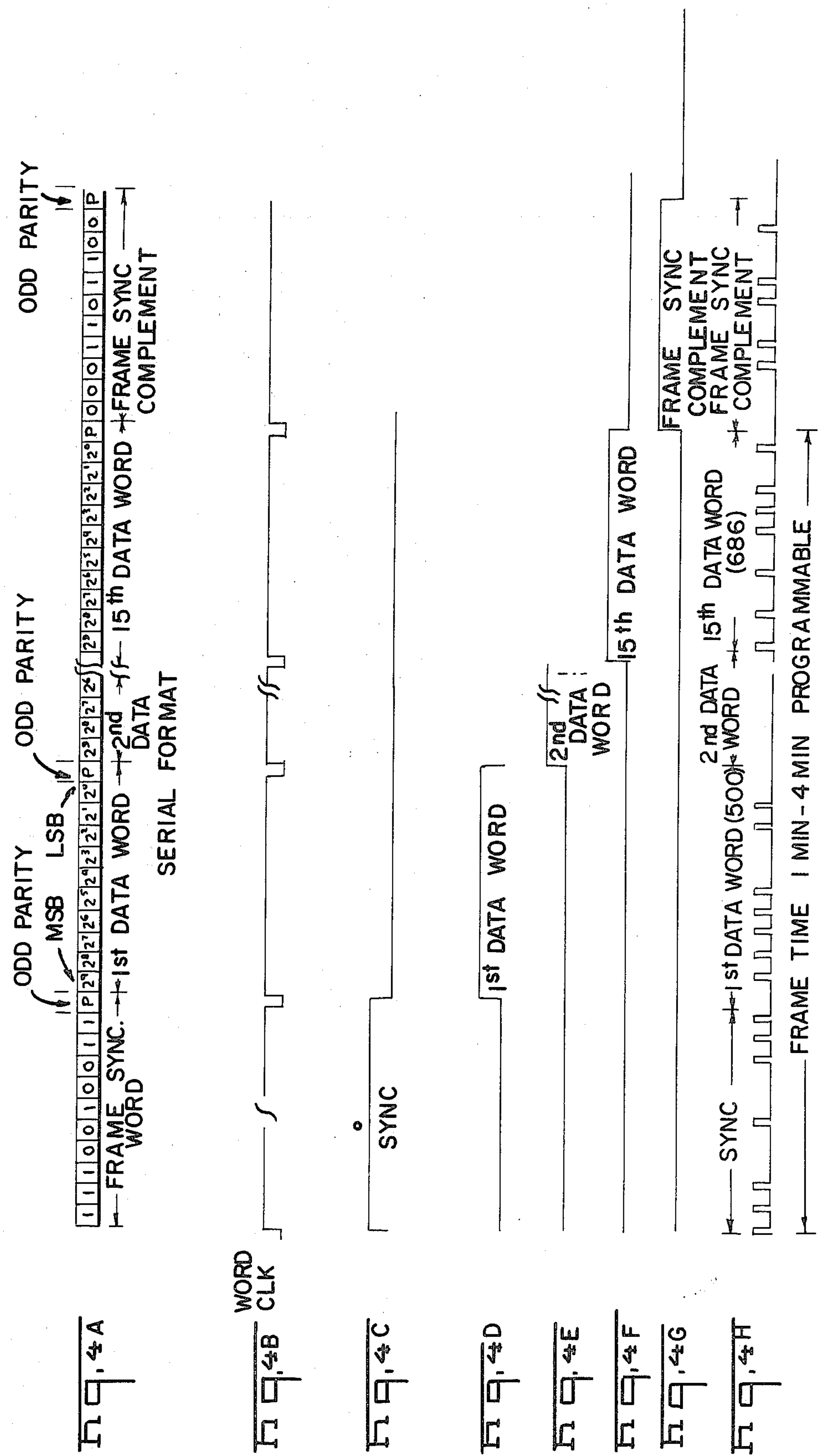
FIGS. 4A–4H show wave forms depicting the operation of the invention.

FIGS. 4A–4H show the make-up of one complete frame of the serial-by-bit data words transmitted uphole. FIG. 4A shows the sync word and its complement with 15 data words between the sync words. FIG. 4B shows the word clock; FIG. 4C shows the time during which the sync word is transmitted; FIG. 4D shows the time in which the first data word is transmitted; FIG. 4E shows the start of transmission of the second data word; FIG. 4F shows the time of transmission of the fifteenth data word; and FIG. 4G shows the time of transmission of the complement of the sync word which signifies the completion of the transmission of one frame. FIG. 4H depicts the serialby-bit transmission of one frame. This is the signal applied to the encoder.

A PROGRAMMED SYNCHRONOUS FREQUENCY DIVIDER, FIG. 5

Figure 5A:
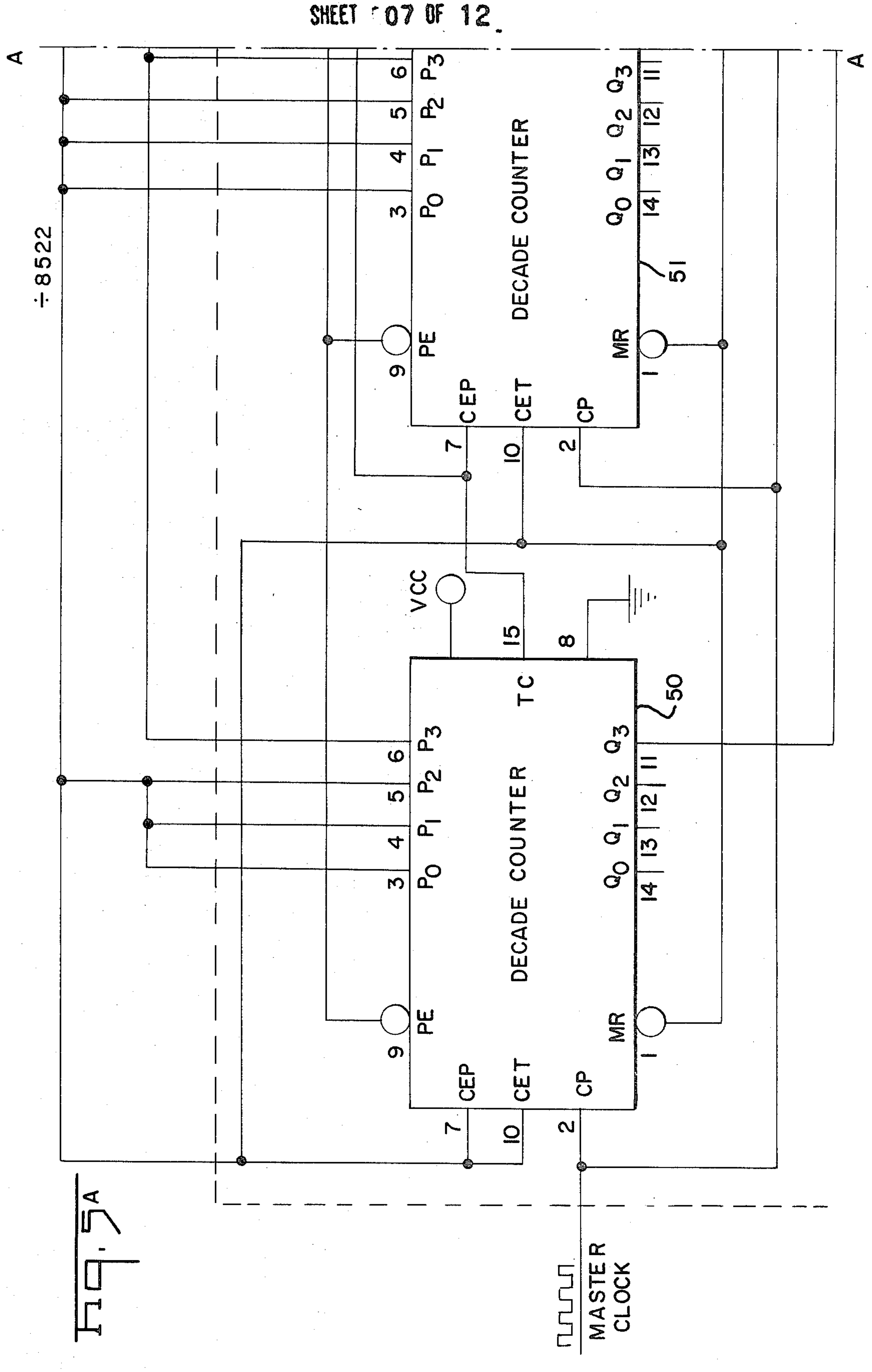
Figure 5B:
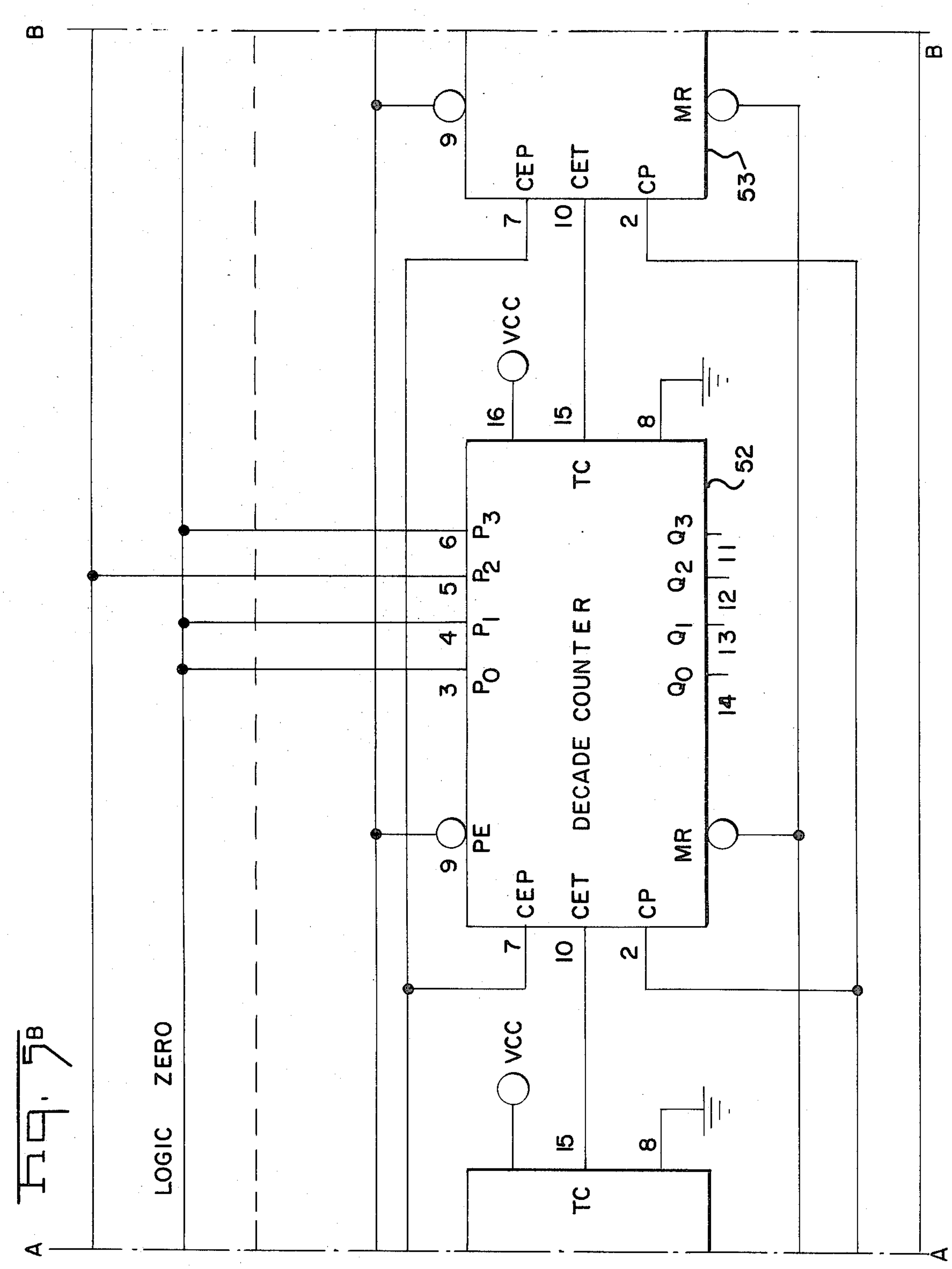
Figure 7C:
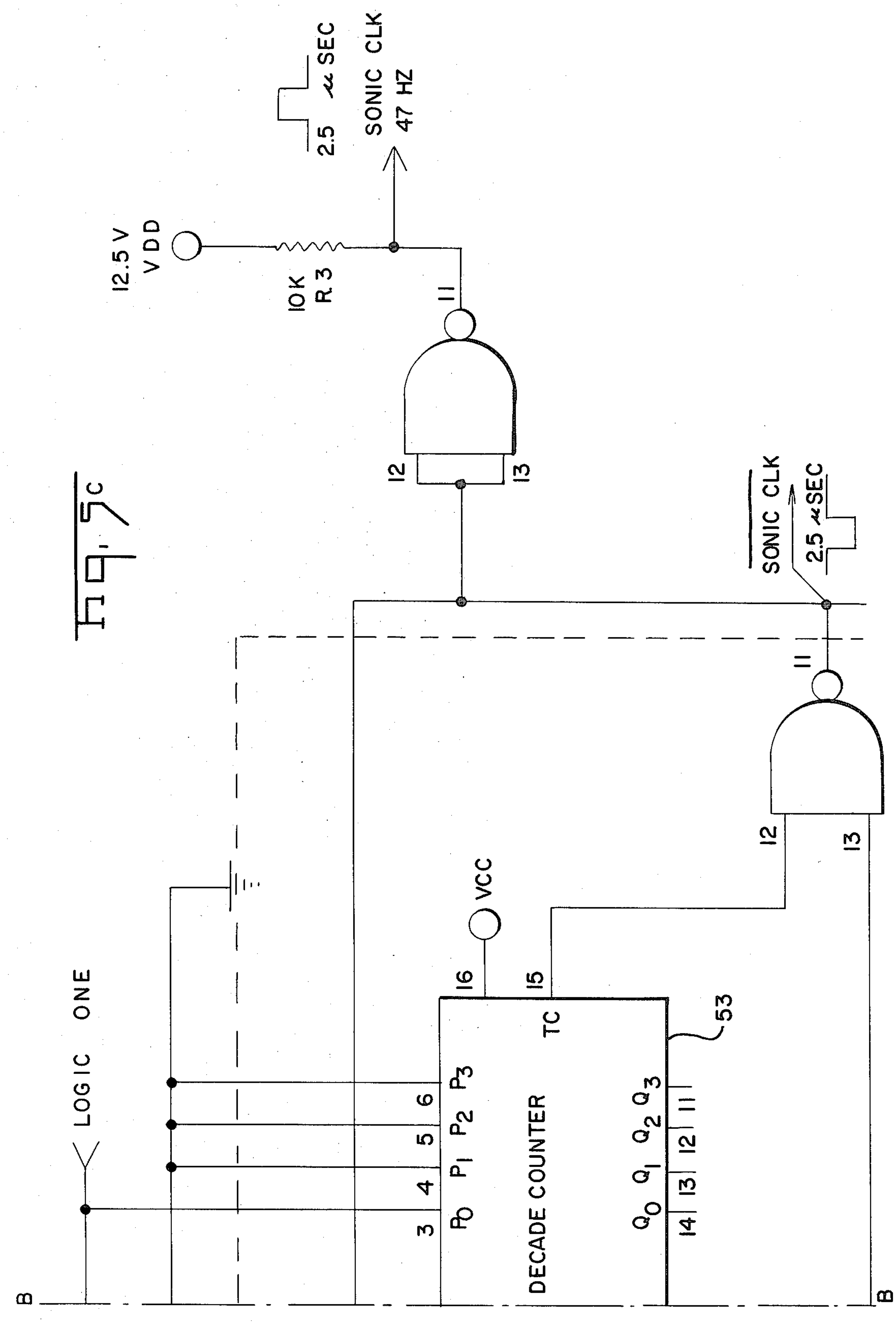

FIGS. 5A–5C show the circuit diagram of a typical programmed synchronous divider. The particular divider shown is that of the divider 17 programmed to perform a division by 8,522. The decade counters 50–53 are integrated circuit decade counters, in this case a circuit commercially available under the designation F9310. While the counters have been shown programmed by inputs $P_0$, $P_1$, $P_2$ and $P_3$ to divide by 8,522, it will be appreciated that the programming can be changed to provide any suitable programmed division. The other frequency dividers are similar in nature.

ANALOG-TO-DIGITAL CONVERTER, FIG. 6

Figures 6, 6B:
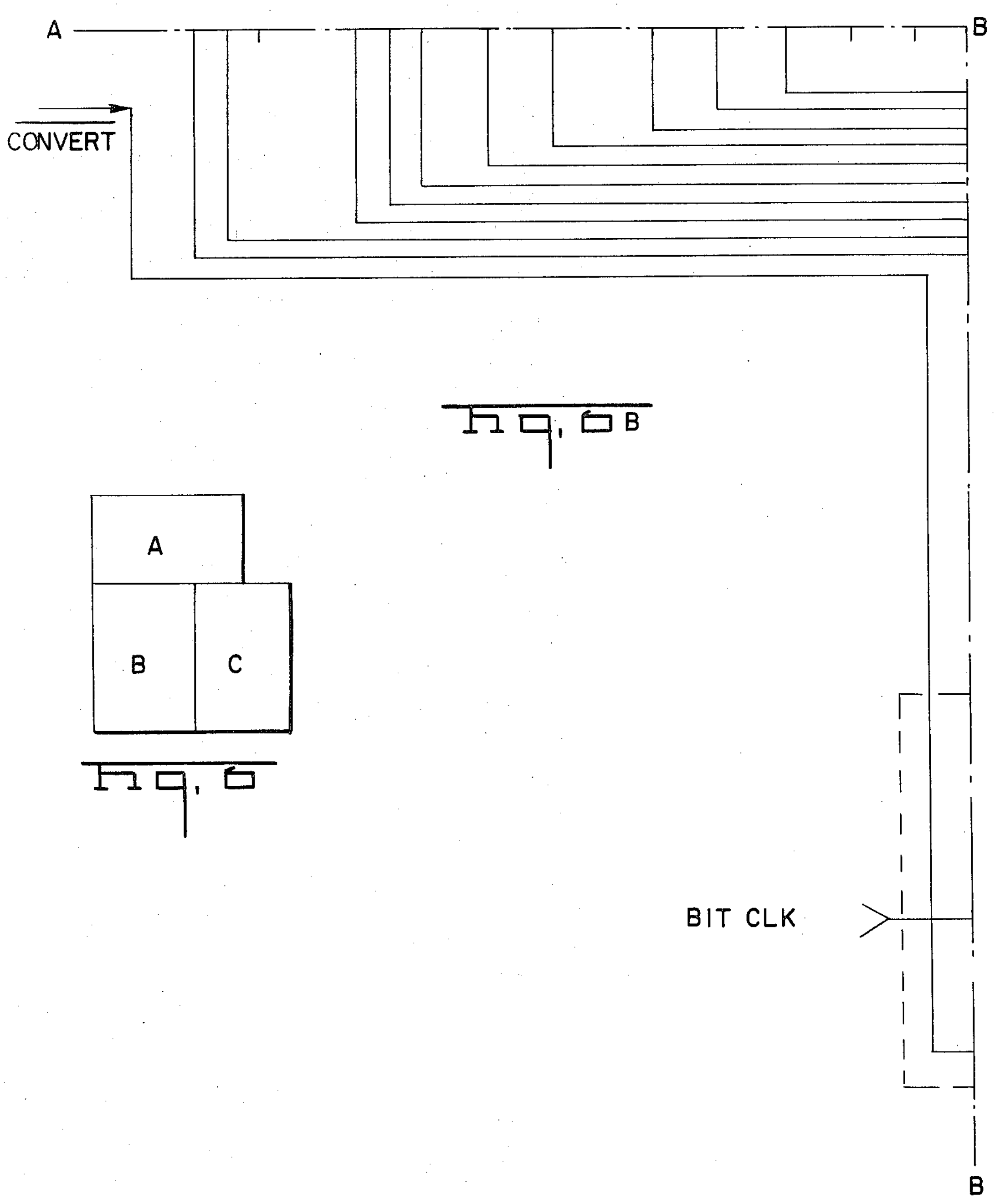
FIG. 6 shows the manner in which FIGS. 6A–6C fit together to form a schematic diagram of the analog-to-digital converter and associated circuits.
Figure 6A:
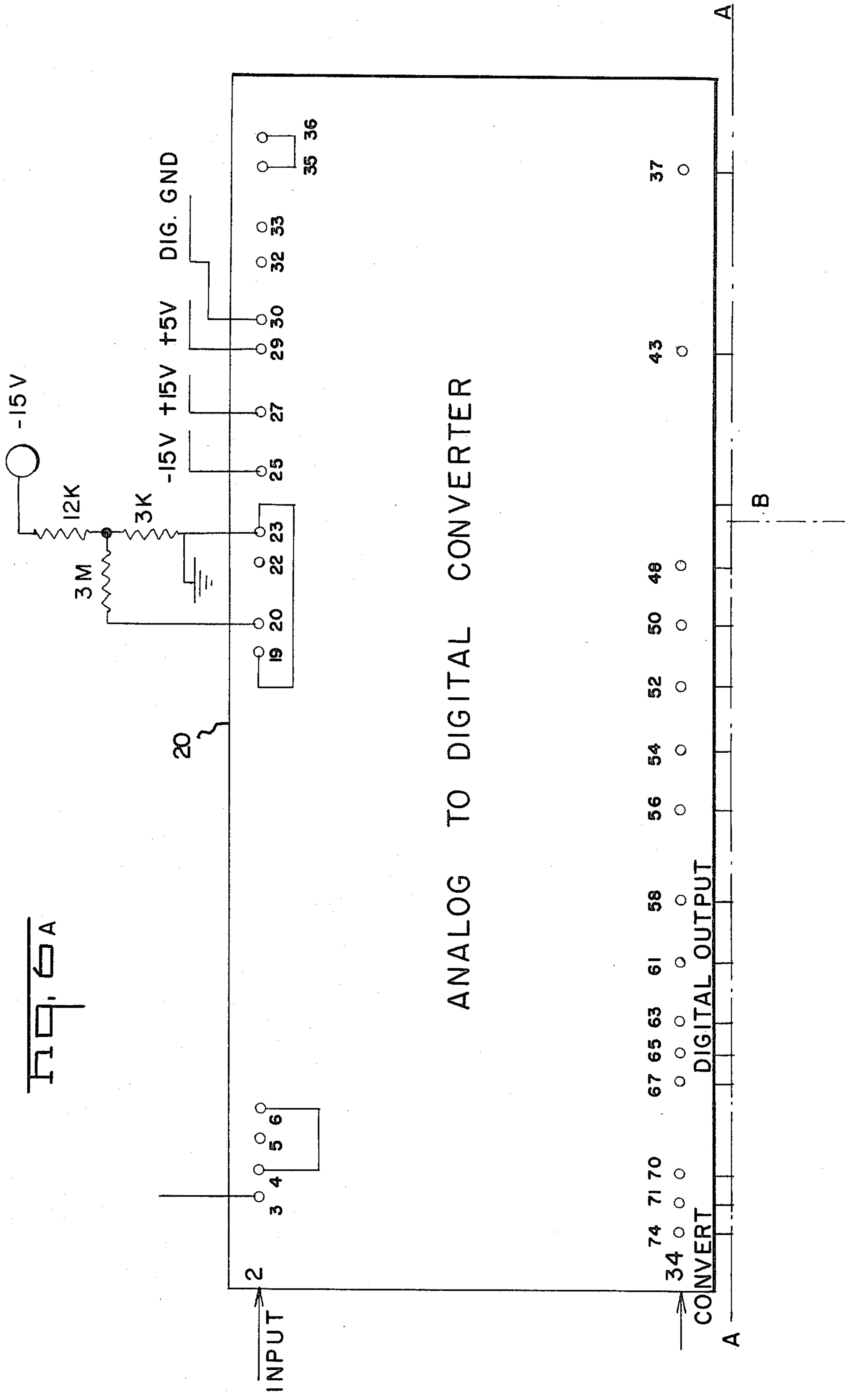
Figure 6C:
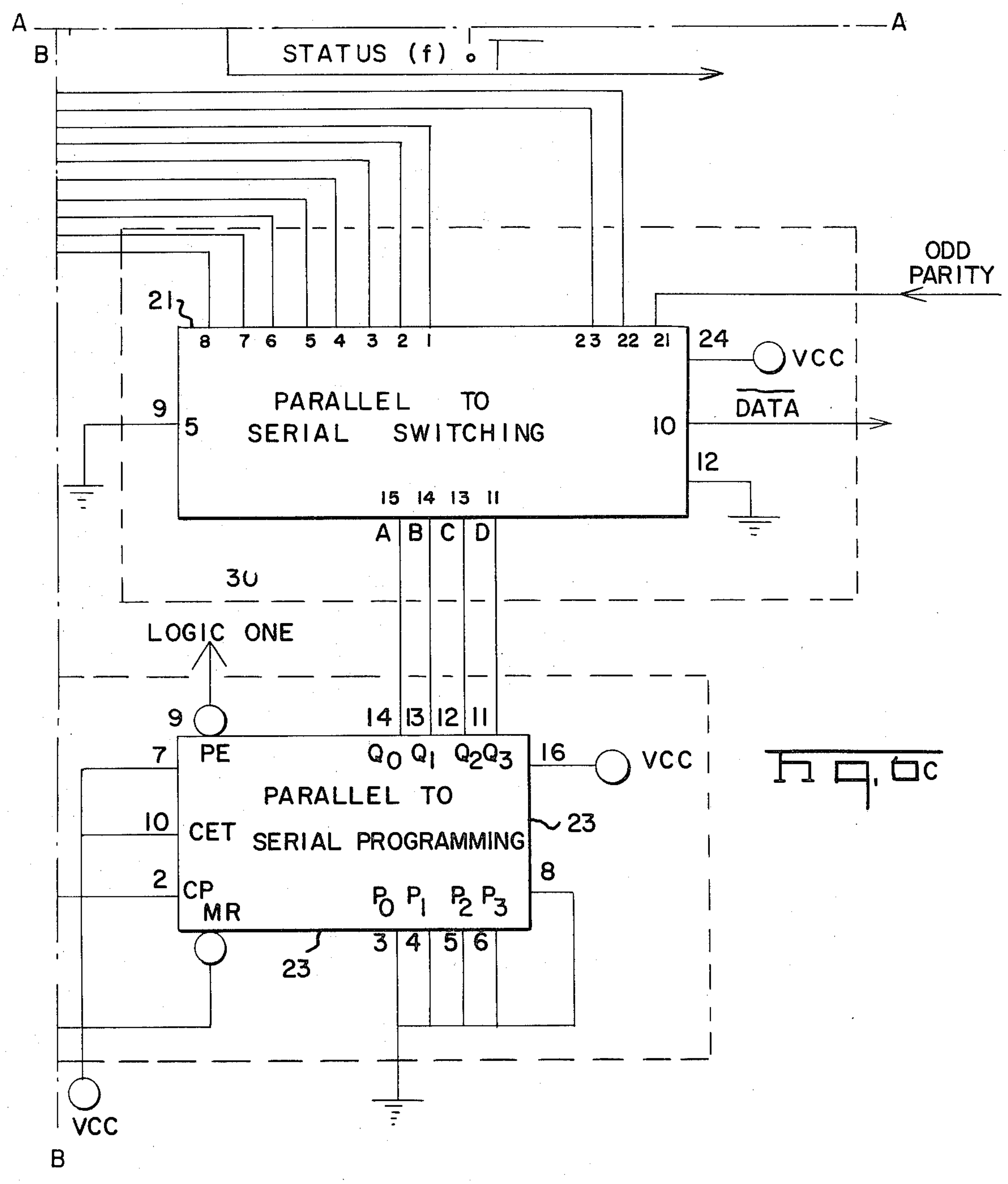

FIG. 6 shows the circuit of the analog-to-digital converter 20, the parallel to serial switching 21 and the parallel to serial programmer 23. In the example shown, the analog-to-digital converter 20 is a module supplied by Analog Devices Corporation. The parallel to serial switching 21 is an integrated circuit commercially available under the designation Ser. No. 54150J and the parallel to serial programmer 23 is commercially available integrated circuit sold under the designation F9316.

The remainder of the circuitry shown in the block diagrams consists of commercially available integrated circuits interconnected as described with reference to the block diagram. The operation of the circuitry is apparent from the description of the operation of the block diagram.

While particular embodiments of the invention have been shown and described, modifications are within the scope of this invention and the appended claims are intended to cover such modifications.

What is claimed is:

1. In a logging-while-drilling system for transmitting downhole measured conditions to the surface of the earth during the drilling of a well utilizing a flowing drilling liquid, said system being of the type including:

an acoustic generator having a movable member which when driven at a constant speed produces in the liquid a continuous acoustic wave signal having a first phase state and having a frequency proportional to the speed of movement of said movable member, a plurality of transducers for sensing downhole conditions and for generating analog signals representative of said conditions, an encoder, and driving means for said member responsive to the output of said encoder, an improved digital data generator comprising:

an analog-to-digital converter for converting said analog signals to digital words including a plurality of parallel bits each represented by two states "0" and "1,"

multiplexing means for sequentially applying said analog signals to said analog-to-digital converter, a parallel to serial switching means for sequentially switching each of said parallel bits to a single output to convert said parallel bits to a serial-by-bit signal, said serial-by-bit signal being applied to said encoder which transmits digital words in response thereto, a stable source of high frequency clock pulses, and first, second and third frequency divider means responsive to said clock pulses for respectively producing sonic clock pulses, bit clock pulses and word clock pulses, said sonic clock pulses being applied to said encoder such that said driving means enables said acoustic generator to produce said acoustic signal with constant frequency and phase state, said bit clock pulses being applied to said switching means which sequentially switches each of said parallel bit to a signle output in response to said bit clock pulses, and said word clock pulses being applied to said multiplexing means which sequentially applies said analog signals to analog-to-digital converter in response to said word clock pulses.

2. The system recited in claim 1 wherein said second divider is a programmable synchronous divider having means for changing the number of sonic clock pulses per bit so that the number of sonic cycles per bit can be increased, thus lengthening the time interval of each bit, as the signal-to-noise ratio of said sonic signal decreases with increasing depth of said acoustic generator in said well.

3. The system recited in claim 1 wherein said first, second and third frequency dividers are connected in series, said frequency dividers each being adjustable to allow independent adjustment of the sonic frequency, the time interval of each bit and the number of bits per word.

4. The system recited in claim 1 wherein said multiplexing means includes a multiplexer programmer having a plurality of settable stages, said word clock pulses being applied to said programmer to sequentially set said stages, the outputs of said stages being used to sequentially apply said analog signals to said analog-to-digital converter, the output of the last stage producing a frame clock pulse indicating the completion of conversion of each of said analog signals.

5. The system recited in claim 4 wherein the number of settable stages is adjustable to allow independent adjustment of the number of words per frame. adjustment of the number of words per frame.

6. The system recited in claim 4 further comprising:

a sync generator for generating a sync word applied to said encoder, said frame clock pulse being applied to actuate said sync word generator.

7. The system of claim 6 further comprising:

a complement generator, the output of said word generator being applied to said complement generator, a sync gate, the outputs of said sync word generator and said complement generator being applied to said sync gate, and a sync word flip-flop, said frame clock pulses being applied to said sync word flip-flop to toggle it, the outputs of said flip-flop being applied to enable said sync gate to pass either said sync word or the complement of said word to said encoder so that said sync word is applied to said encoder after certain frames and the complement of said sync word is applied to said encoder after alternate frames.

8. The system recited in claim 7 wherein the output of said sync word flip-flop is applied to said sync word generator so that the state of said flip-flop is included as the parity bit in each sync signal.

9. The system recited in claim 6 further comprising:

a parallel-serial programmer having a plurality of settable stages, said bit clock pulses being applied to said programmer to sequentially set said stages, the outputs of said stages being applied to said parallel to serial converter to sequentially switch each of said parallel bits to a single output, the outputs of said stages being also applied to each sync word generator to sequentially switch the bits of each sync word to said single output.

10. The system recited in claim 1 further including a parity generator for generating a parity bit for each digital word comprising:

a flip-flop re-set by said word clock pulses, said serial-by-bit signal being applied to said flip-flop to toggle said flip-flop in response to one state of said serial-by-bit signal, the output of said flip-flop being applied to said switching means so that the state of said flip-flop is included as the parity bit in said serial by bit signal.

11. The system recited in claim 12 further comprising:

a parallel-serial programmer having a plurality of settable stages, said bit clock pulses being applied to said programmer to sequentially set said stages, the outputs of said stages being applied to said switching means to sequentially switch each of said parallel bits to a single output.

* * * * *

UNITED STATES PATENT OFFICE
CERTIFICATE OF CORRECTION

Patent No. 3,821,696 Dated June 28, 1974

Inventor(s) John W. Harrell, Bobbie J. Patton, and Billy G. Ballard

It is certified that error appears in the above-identified patent and that said Letters Patent are hereby corrected as shown below:

In the first column of the title page, the assignee should be corrected to read as follows:

[73] Assignee: Mobil Oil Corporation, New York, N.Y.

same column, under "[56] References Cited", the inventor shown for Patent No. 3,309,656 should read --Godbey--.

Column 3, line 21, "Bit pulses" should read --Bit clock pulses--.
Column 5, line 35, "serialby-bit" should read -- serial-by-bit --.
Column 6, line 50, "parallel bit" should read --parallel bits--; line 51, "signle" should read --single.
Column 7, lines 14 and 15 (Claim 5, lines 3 and 4), after "frame." (line 14) cancel "adjustment of the number of words per frame."
Column 8, line 27 (Claim 11, line 1), "The system recited in claim 12" should read --The system recited in claim 1--.

Signed and sealed this 3rd day of December 1974.

(SEAL)
Attest:

McCOY M. GIBSON JR.
Attesting Officer

C. MARSHALL DANN
Commissioner of Patents